US012771426B2

(12) United States Patent
Raghavan et al.

(10) Patent No.: US 12,771,426 B2
(45) Date of Patent: Oct. 20, 2026

(54) CALIBRATION VIA TWO-WAY SIGNALING TO ENABLE ANTENNA MODULE COMBINING

(71) Applicant: QUALCOMM Incorporated, San Diego, CA (US)

(72) Inventors: Vasanthan Raghavan, West Windsor Township, NJ (US); Andrew Arnett, San Diego, CA (US); Kobi Ravid, Closter, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 294 days.

(21) Appl. No.: 18/604,701

(22) Filed: Mar. 14, 2024

(65) Prior Publication Data

US 2025/0293747 A1 Sep. 18, 2025

(51) Int. Cl.
*H04B 7/06* (2006.01)
*H04B 7/0404* (2017.01)

(52) U.S. Cl.
CPC ......... *H04B 7/0634* (2013.01); *H04B 7/0404* (2013.01)

(58) Field of Classification Search
CPC .......... H04B 7/06; H04B 7/0634; H04B 7/04; H04B 7/0404; H04B 17/11; H04B 17/12; H04B 17/14; H04W 16/28
See application file for complete search history.

(56) References Cited

U.S. PATENT DOCUMENTS

2004/0157646 A1* 8/2004 Raleigh .................. H01Q 3/267 455/562.1
2007/0207730 A1* 9/2007 Nguyen ............... H01Q 3/2605 455/39
2010/0117903 A1* 5/2010 Zheng .................... H04B 7/086 342/373
2013/0016003 A1* 1/2013 Stirling-Gallacher ... H01Q 3/26 342/372
2023/0283417 A1* 9/2023 Svendsen ............... H04B 7/088 370/330
2025/0047359 A1* 2/2025 Raghavan ............ H04B 7/0628

* cited by examiner

*Primary Examiner* — Mohamed A Kamara
(74) *Attorney, Agent, or Firm* — Patterson + Sheridan, L.L.P.

(57) ABSTRACT

Certain aspects of the present disclosure provide a method for wireless communications at a user equipment (UE). The UE may receive a first set of transmissions via multiple antenna elements from multiple antenna modules of the UE by using a set of beam weights. One or more of the multiple antenna elements are associated with first parameter information. The UE may transmit a second set of transmissions via the multiple antenna elements by using the set of beam weights. The one or more of the multiple antenna elements are associated with second parameter information. The UE may adjust the set of beam weights in accordance with one or more differences between the first parameter information and the second parameter information.

19 Claims, 10 Drawing Sheets

CALIBRATION VIA TWO-WAY SIGNALING TO ENABLE ANTENNA MODULE COMBINING

BACKGROUND

Field of the Disclosure

Aspects of the present disclosure relate to wireless communications, and more particularly, to techniques for managing calibration associated with, for example, simultaneous communications with multiple antenna modules of a wireless node.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications at a user equipment (UE). The method includes obtaining a first set of transmissions via multiple antenna elements simultaneously from multiple antenna modules of the UE by using a set of beam weights, wherein one or more of the multiple antenna elements are associated with first parameter information, and wherein the first parameter information indicates at least one of: a phase response or an amplitude response corresponding to a receive portion of a radio frequency (RF) circuit of the one or more of the multiple antenna elements; outputting a second set of transmissions via the multiple antenna elements by using the set of beam weights, wherein the one or more of the multiple antenna elements are associated with second parameter information, and wherein the second parameter information indicates at least one of: a phase response or an amplitude response corresponding to a transmit portion of the RF circuit of the one or more of the multiple antenna elements; and adjusting the set of beam weights in accordance with one or more differences between the first parameter information and the second parameter information.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
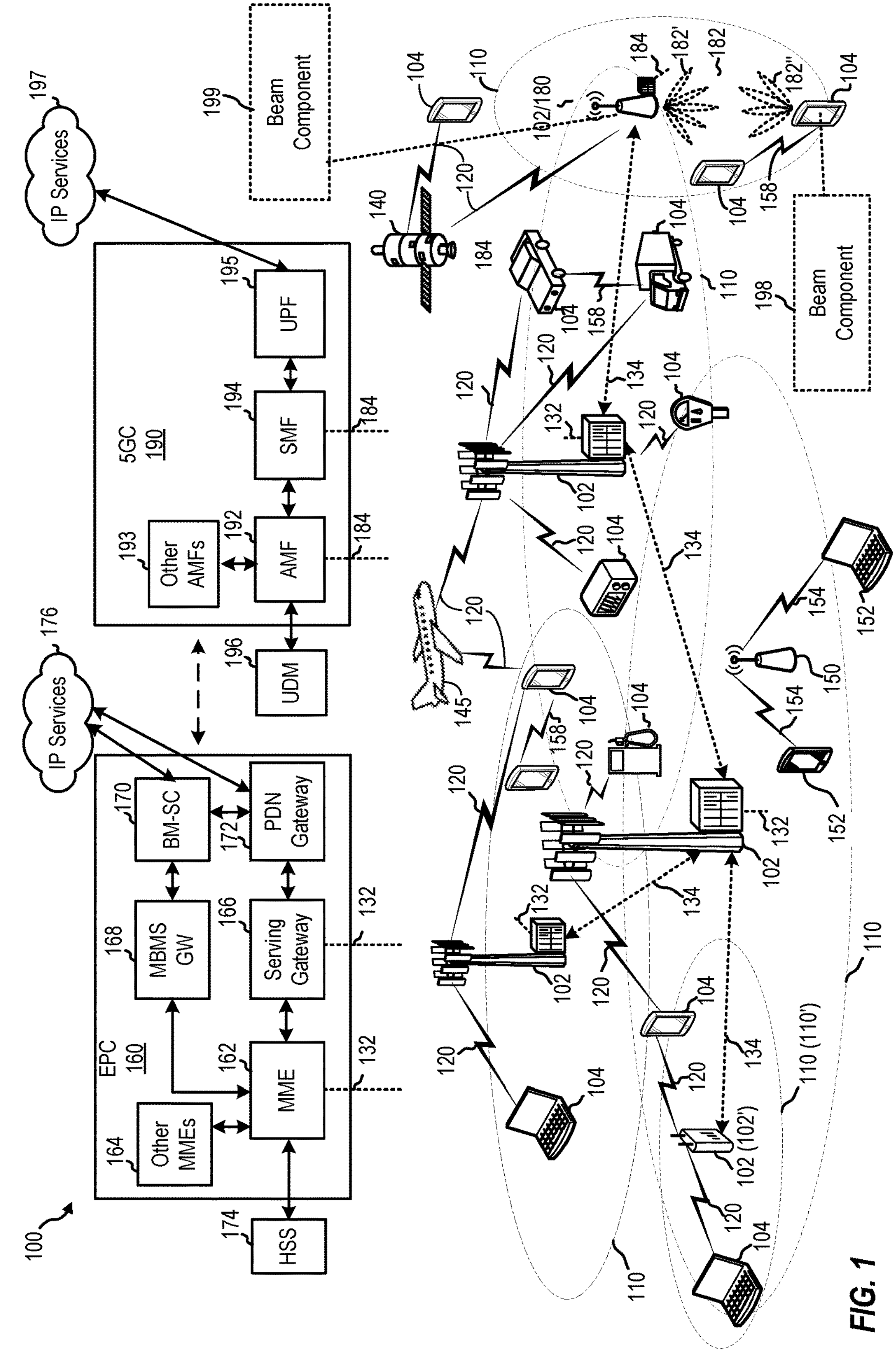
FIG. 1 depicts an example wireless communications network.

Aspects of the present disclosure provide apparatuses, methods, processing systems, and computer-readable mediums for managing calibration for simultaneous communications with multiple antenna modules of a wireless node, such as a user equipment (UE).

In wireless systems, a channel between devices, such as a UE and a gNodeB (gNB), is typically characterized by multiple clusters. Each cluster corresponds to a reflection or scattering of signals from the gNB to the UE via a physical object. Azimuth angle of arrival (AOA) and zenith angle of arrival (ZOA) of signals for each of the cluster as seen at the UE side can be along any direction (e.g., due to reflections from different objects, etc.). Since the AOA and the ZOA of the signals are expected to be from any direction at the UE side, good antenna array gain metrics for a UE may include a good coverage of the antenna array gain over a sphere around the UE. This is called as a spherical coverage of effective isotropic radiated power (EIRP) and/or effective isotropic sensitivity (EIS). EIRP is a measurement of a radiated output power from an equivalent isotropic antenna (or antenna element) in a single direction. In antenna measurements, measured sensitivity over each angle is called the EIS of an antenna in that direction.

In some cases, multiple antenna modules are used at the UE to achieve a good spherical coverage (e.g., at a frequency range 2 (FR2) and beyond frequencies). Each antenna module may be controlled (or managed) by one or more radio frequency (RF) integrated circuit (RFIC) chips.

In some cases, to improve spherical coverage performance (e.g., especially tail performance of the spherical coverage), antenna modules with multiple boresight directions may be used at the UE. In some cases, the antenna modules including larger linear and/or planar antenna arrays (e.g., 1×8 antenna array, 2×4 antenna array, etc.) may be used at the UE to improve the spherical coverage performance (e.g., the tail performance of the spherical coverage). However, the use of the larger linear and/or planar antenna arrays may result in increased cost of the UE.

To keep the cost of the UE low, the antenna modules including smaller linear and/or planar antenna arrays (e.g., 1×4 antenna array, 1×3 antenna array, etc.) may be used at the UE. In such UEs, the multiple antenna modules may be positioned at different parts of the UE including edges of the UE (e.g., to achieve good spherical coverage). The multiple antenna modules on the different edges of the UE can be combined (e.g., connected to each other via an RF, intermediate frequency (IF) or another frequency cable or a connector) for receiving and/or transmitting signals (e.g., as this may assist in improving performance in terms of signal coverage).

In millimeter wave (mmW) systems, there may be some variations associated with the signals at mmW frequency bands. For example, the signals at the mmW frequency bands may be affected by temperature differences corresponding to the different antenna modules of the UE (e.g., which may be connected to each other), a distance between the antenna modules of the UE, etc. In such cases, to ensure that a beam from each antenna module of the UE may point to a certain boresight direction during the transmit/receive operations, the different antenna modules of the UE may have to be calibrated. The calibration may be performed, for example, so that same/similar phase and/or amplitude values are applicable at antennas of the different antenna modules and this may enable the beam from each antenna module of the UE to point to the certain boresight direction.

Techniques proposed herein may use two-way signaling between a gNB and a UE to perform the inter-RFIC chip calibration. For example, the proposed techniques may require some signaling between the gNB and the UE as well as some feedback from the gNB to the UE to collect all information needed to perform the inter-RFIC chip calibration.

The signaling between the gNB and the UE may include: the gNB beamforming over symbols corresponding to all the antenna elements of the antenna modules of the UE and the UE receiving first set of signals from the gNB, and the UE beamforming with the same beams over the same symbols and the gNB receiving second set of signals from the UE. The gNB may send the feedback to the UE indicating information associated with the second set of signals, since the information associated with the second set of signals is not known by the UE. The UE may compute calibration adjustment parameters based on information associated with the first set of signals (e.g., which is known to the UE since the UE received the first set of signals) and the information associated with the second set of signals (e.g., which is obtained from the gNB). The calibration adjustment parameters may indicate differences between first phase and/or amplitude values applicable at the antennas of the different antenna modules (e.g., during uplink) and second phase and/or amplitude values applicable at the antennas of the different antenna modules (e.g., during downlink). The UE may adjust uplink and/or downlink part of RFIC chip circuitry of the different antenna modules based on the calibration adjustment parameters.

Particular aspects of the subject matter described in this disclosure can be implemented to realize one or more of the following potential advantages. In some examples, the described inter-RFIC chip calibration techniques may allow/enable the combining of the multiple antenna modules of the UE for receiving and/or transmitting the signals, which may improve performance in terms of signal coverage.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio BS, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
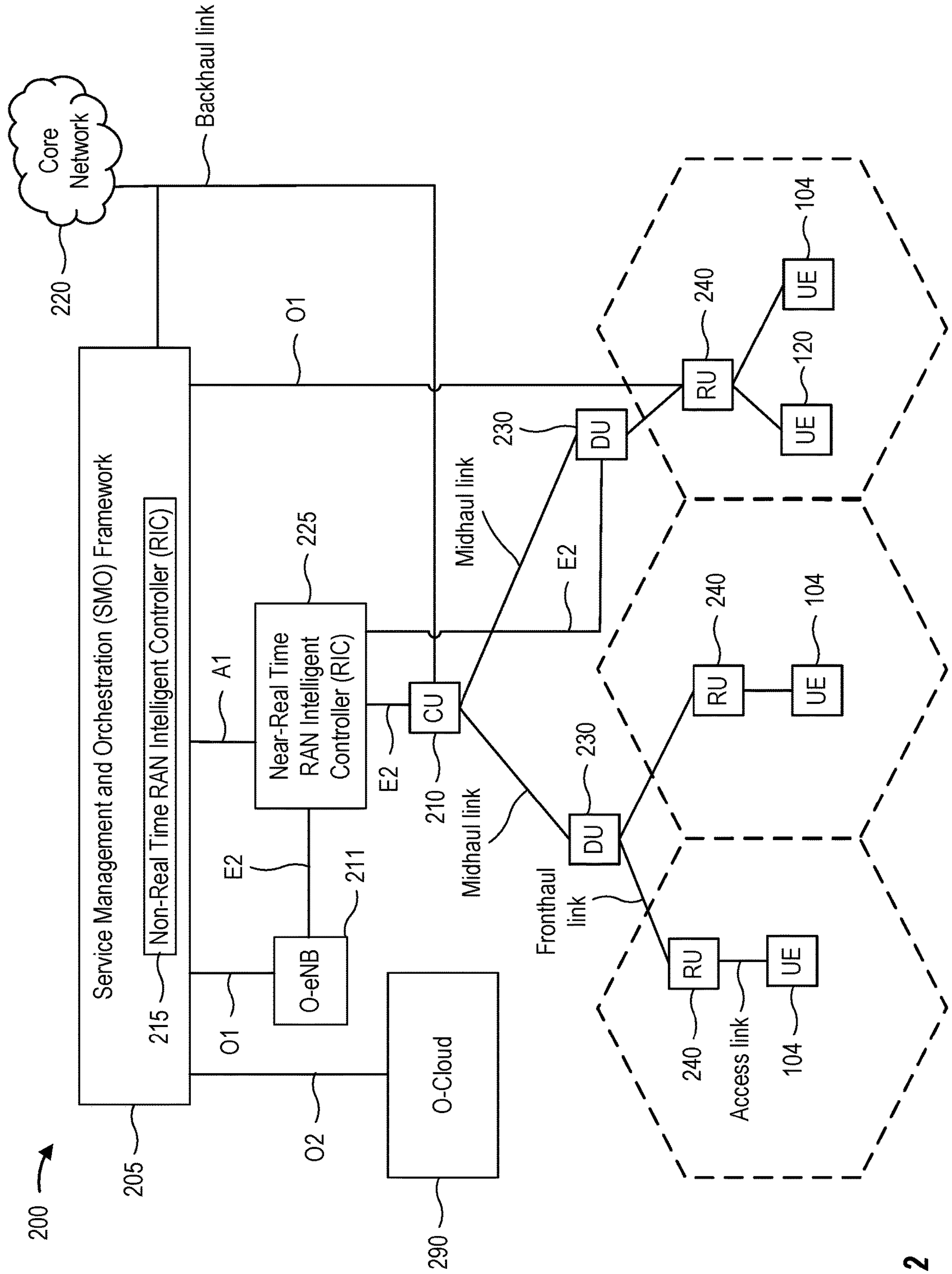
FIG. 2 depicts an example disaggregated base station (BS) architecture.

While BSs 102 are depicted in various aspects as unitary communications devices, BSs 102 may be implemented in various configurations. For example, one or more components of a BS 102 may be disaggregated, including a central unit (CU), one or more distributed units (Dus), one or more radio units (RUs), a Near-Real Time (Near-RT) RAN Intelligent Controller (RIC), or a Non-Real Time (Non-RT) RIC, to name a few examples. In another example, various aspects of a BS 102 may be virtualized. More generally, a BS (e.g., BS 102) may include components that are located at a single physical location or components located at various physical locations. In examples in which a BS 102 includes components that are located at various physical locations, the various components may each perform functions such that, collectively, the various components achieve functionality that is similar to a BS 102 that is located at a single physical location. In some aspects, a BS 102 including components that are located at various physical locations may be referred to as a disaggregated radio access network (RAN) architecture, such as an Open RAN (O-RAN) or Virtualized RAN (VRAN) architecture. FIG. 2 depicts and describes an example disaggregated BS architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 130) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHz-6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mmWave"). A BS configured to communicate using mmWave/near mmWave radio frequency bands (e.g., a mmWave BS such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain BSs (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

Figure 9:
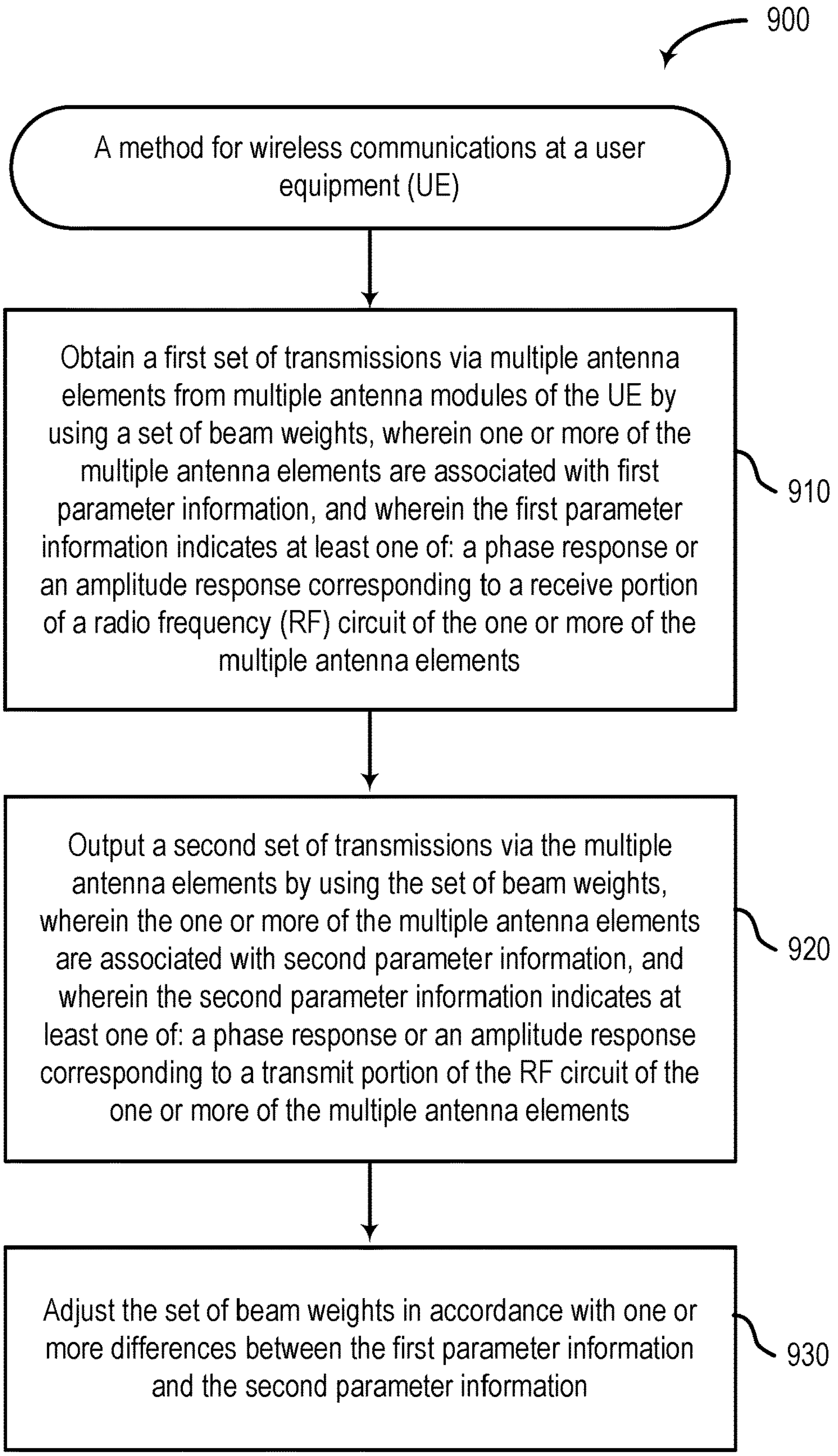
FIG. 9 depicts a method for wireless communications at a wireless node such as a UE for managing combining of multiple antenna modules.

Wireless communication network 100 further includes beam component 198, which may be configured to perform method 900 of FIG. 9. Wireless communication network 100 further includes beam component 199, which may be configured to perform method 900 of FIG. 9.

In various aspects, a network entity or network node can be implemented as an aggregated BS, as a disaggregated BS, a component of a BS, an integrated access and backhaul (IAB) node, a relay node, a sidelink node, to name a few examples.

FIG. 2 depicts an example disaggregated BS 200 architecture. The disaggregated BS 200 architecture may include one or more central units (CUs) 210 that can communicate directly with a core network 220 via a backhaul link, or indirectly with the core network 220 through one or more disaggregated BS units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (Dus) 230 via respective midhaul links, such as an F1 interface. The Dus 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more BS functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an AI interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as AI policies).

Figure 3:
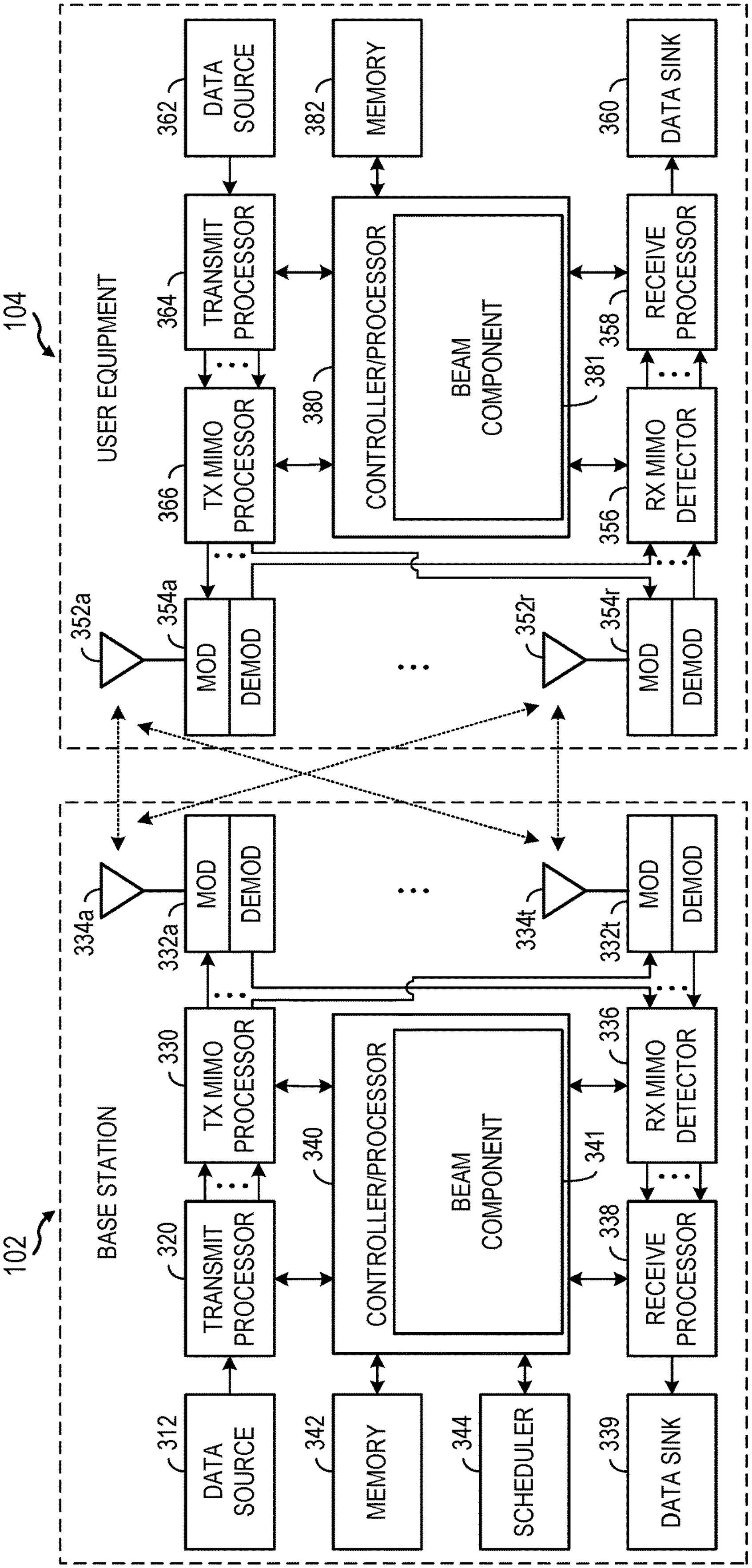
FIG. 3 depicts aspects of an example BS and an example user equipment (UE).

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

BS 102 includes controller/processor 340, which may be configured to implement various functions related to wireless communications. In the depicted example, controller/processor 340 includes beam component 341, which may be representative of beam component 199 of FIG. 1. Notably, while depicted as an aspect of controller/processor 340, beam component 341 may be implemented additionally or alternatively in various other aspects of BS 102 in other implementations.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

UE 104 includes controller/processor 380, which may be configured to implement various functions related to wireless communications. In the depicted example, controller/processor 380 includes beam component 381, which may be representative of beam component 138 of FIG. 1. Notably, while depicted as an aspect of controller/processor 380, beam component 381 may be implemented additionally or alternatively in various other aspects of UE 104 in other implementations.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the SRS). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs 104 for data transmission on the downlink and/or uplink.

In various aspects, BS 102 may be described as transmitting and receiving various types of data associated with the methods described herein. In these contexts, "transmitting" may refer to various mechanisms of providing or outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIG. 4A, FIG. 4B, FIG. 4C, and FIG. 4D depict aspects of data structures for a wireless communications network, such as wireless communications network 100 of FIG. 1.

Figures 4A, 4B, 4C, 4D:
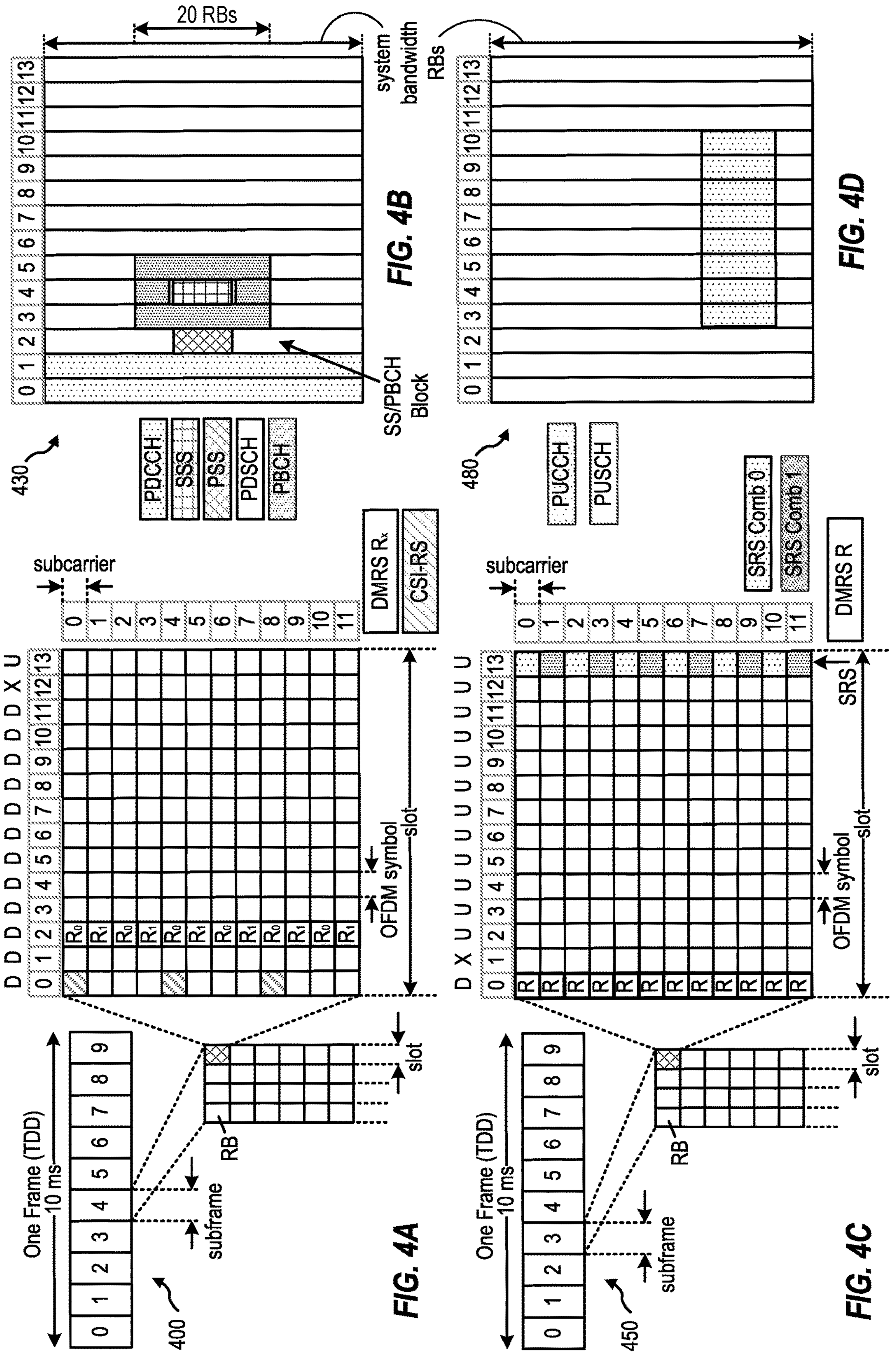
FIG. 4A, FIG. 4B, FIG. 4C, and FIG. 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIG. 4B and FIG. 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be TDD, in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs 104 may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2\times15$ kHz, where is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIG. 4A, FIG. 4B, FIG. 4C, and FIG. 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIG. 4A, FIG. 4B, FIG. 4C, and FIG. 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIG. 1 and FIG. 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIG. 1 and FIG. 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the BS. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a BS for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Introduction to mmWave Wireless Communications

In wireless communications, an electromagnetic spectrum is often subdivided into various classes, bands, channels, or other features. The subdivision is often provided based on wavelength and frequency, where frequency may also be referred to as a carrier, a subcarrier, a frequency channel, a tone, or a subband.

5$^{th}$ generation (5G) networks may utilize several frequency ranges, which in some cases are defined by a standard, such as 3$^{rd}$ generation partnership project (3GPP) standards. For example, 3GPP technical standard TS 38.101 currently defines Frequency Range 1 (FR1) as including 600 MHz-6 GHz, though specific uplink and downlink allocations may fall outside of this general range. Thus, FR1 is often referred to (interchangeably) as a "Sub-6 GHz" band.

Similarly, TS 38.101 currently defines Frequency Range 2 (FR2) as including 26-41 GHz, though again specific uplink and downlink allocations may fall outside of this general range. FR2, is sometimes referred to (interchangeably) as a "millimeter wave" ("mmW" or "mmWave") band, despite being different from the extremely high frequency (EHF) band (30 GHz-300 GHz) that is identified by the International Telecommunications Union (ITU) as a "millimeter wave" band because wavelengths at these frequencies are between 1 millimeter and 10 millimeters.

Communications using mmWave/near mmWave radio frequency band (e.g., 3 GHz-300 GHz) may have higher path loss and a shorter range compared to lower frequency communications. As described above with respect to FIG. 1, a base station (BS) (e.g., 180) configured to communicate using mmWave/near mmWave radio frequency bands may utilize beamforming (e.g., 182) with a user equipment (UE) (e.g., 104) to improve path loss and range.

Overview of Radio Frequency (RF) Chain/Circuits

A user equipment (UE) may include one or more radio frequency (RF) chains and/or RF integrated circuits (RFICs). An RF chain of the UE converts baseband (BB) signals and RF signals. At a transmit end, the RF chain may convert the BB signals to analog signals. Through digital frequency conversion and filtering, the RF chain may convert the BB signals and RF signals. At a receiving end, the RF chain may convert the RF signals and BB signals, and may also convert analog RF signals into baseband signals.

The RF chain may be a cascade of electronic components and sub-units, which may include amplifiers, filters, mixers, attenuators and detectors. For example, the RF chain may include an RF analog-to-digital converter (ADC), RF digital-to-analog converter (DAC), low-pass filters, phase shifters, a power amplifier (PA), a digital downconverter and upconverter, RF filters, a low noise amplifier (LNA), and/or a digital clock oscillator (CLK). A phase-locked loop/voltage-controlled oscillator (PLL/VCO) may provide a local oscillator (LO) for the digital up converter and downconverter. A switch may connect antennas to receive and/or transmit RF chains of the UE use for receive and/or transmit operations.

Overview of Beamforming

In millimeter wave (mmW) systems, beamforming technologies are used to increase array gain. For example, devices such as user equipments (UEs) and network entities (e.g., a gNodeB (gNB)) using wireless communication technologies may include multiple antenna arrays. Each antenna array may include one or more transmission and reception antennas (or antenna elements) that can be co-phased and are configured to transmit and receive communications over one or more spatial streams/layers. The use of the multiple antenna arrays may afford the ability to meet spherical coverage requirements with/without hand/body blockage as well as robustness with beam switching over the antenna arrays.

Increases in the antenna array gain facilitate a better quality of signal transmission and reception. To provide the antenna array gain in a particular direction, beamforming is considered. Beamforming is a technique that utilizes advanced antenna technologies on both UEs and gNBs to focus a wireless signal according to a set of beam weights (e.g., in a specific direction), rather than broadcasting to a wide area. For beamforming at a UE, it usually includes a UE receive (Rx) beam sweep from a set of different beams. Beamforming may improve signal-to-noise ratio (SNR) of received signals, eliminate undesirable interference sources, and focus the transmitted signals to specific locations.

Beamforming is also performed to establish a link between the gNB and the UE, where both these devices form a beam directed towards (but not limited to this possibility) each other. For example, both the gNB and the UE find at least one adequate beam to form a communication link between each other. gNB-beam and UE-beam form what is known as a beam pair link (BPL). As an example, on a downlink (DL), the gNB uses a transmit beam and the UE uses a receive beam corresponding to the transmit beam to receive a DL transmission. The combination of the transmit beam and the corresponding receive beam is the BPL.

In some cases, multiple antennas at a transmitter and a receiver can be used to achieve array and diversity gain instead of capacity gain. In this case, a same symbol weighted by a complex-valued scale factor is sent from each transmit antenna so that the input covariance matrix has a unit rank. This scheme is referred to as beamforming. There are two different classes of beamforming: (1) direction-of-arrival beamforming (i.e., adjustment of transmit or receive antenna directivity); and (2) Eigen-beamforming (i.e., a mathematical approach to maximize signal power at the receive antenna based on certain criterion).

An Eigen-beamforming scheme performs linear, single-layer, complex-valued weighting on the transmitted symbols, such that the same signal is transmitted from each transmit antenna using appropriate weighting factors. In this scheme, the objective is to maximize the signal power at the receiver output. When the receiver has multiple antennas, the single-layer beamforming cannot simultaneously maximize the signal power at every receive antenna, hence, precoding is used for multi-layer beamforming in order to maximize the throughput of a multi-antenna system. Precoding is a beamforming scheme to support multi-layer transmission in a multiple-input multiple-output (MIMO) system. Using precoding, multiple streams are transmitted from the transmit antennas with independent and appropriate weighting per antenna such that the throughput is maximized at the receiver output.

In a single-user MIMO system, identity matrix precoding (for open-loop) and singular value decomposition (SVD) precoding (for closed-loop) are used to achieve link-level MIMO channel capacity. In addition, random unitary precoding can achieve the open-loop MIMO channel capacity with no signaling overhead in the uplink. The SVD precoding, on the other hand, has been shown to achieve the MIMO channel capacity when channel state information (CSI) is signaled to the transmitter.

In a precoded MIMO system with $N_t$ transmit antennas and $N_r$ receive antennas, input-output relationship can be described as y=HWs+n where $s=[s_1, s_2, \ldots, s_M]^T$ is an M×1 vector of normalized complex-valued modulated symbols, $y=[y_1, y_2, \ldots, y_{Nr}]^t$ and $n=[n_1, n_2, \ldots, n_{Nr}]^t$ are the $N_r$×1 vectors of received signal and noise, respectively, H is the $N_r$x$N_t$ complex-valued channel matrix, and W is the $N_t$xM linear precoding matrix. The superscript "t" denotes the transpose operator.

In the receiver, a hard decoded symbol vector is obtained by decoding the received vector y by a vector decoder, assuming knowledge of the channel and the precoding matrices. The entries of H are independent and distributed according to Z(0,1) and the entries of noise vector n are independent and distributed according to Z(0,N0). The input vector s is assumed to be normalized, thus $E[ss^H]=I$ where I is an identity matrix. The receiver selects a precoding matrix $W_i$,i=1, 2, . . . , $N_{codebook}$ from a finite set of quantized precoding matrices, and sends the index of the chosen precoding matrix back to the transmitter over a low-delay feedback channel.

In some cases, new radio (NR) may support a spatial multiplexing mode with channel-independent (open-loop) precoding in the form of precoder cycling. For example, a transmitter cycles through four precoders Wi-$W_4$ to precode different sets of four baseband symbol vectors to be transmitted, e.g., $s_r s_4$, $s_5$-$s_8$, etc. The precoders, $W_1$-$W_4$, map the symbol vectors, s(-$s_4$, $s_5$-$s_8$) etc. to precoded baseband symbol vectors, XI-$X_{4>}$ Xs-xβ, etc. through a matrix-vector multiplication operation, e.g., Xi=WISI. The elements of a precoded baseband symbol have a one-to-one correspondence to the transmit antenna ports. Each precoded baseband symbol vector is thereafter transmitted over one of the effective MIMO channels, Hp$H_4$, $H_5$-$H_8$, etc. An effective MIMO channel models the physical radio communications channel along with the physical antennas, radio hardware, and baseband signal processing used to communicate over that channel.

In some cases, cycling is achieved by precoding one symbol Si with precoder matrix $W_1$, symbol $S_2$ with precoder matrix $W_2$, symbol $S_3$ with precoder matrix $W_3$, and symbol $S_4$ with precoder matrix $W_4$, and then using Wi-$W_4$ to precede the next four symbols and so forth. The receiver receives parallel signals $y_r y_4$, $V_5$-$V_8$, etc., and filters them in respective filters fι-$f_4$, $f_5$-$f_8$, etc. modeled based on the four precoders $W_r W_4$ to produce estimates $s_r s_4$, $S_5$-$S_8$, etc. of the symbols $s_r s_4$, $S_5$-$S_8$, etc. originally transmitted. Alternatively, the receiver detects the bit-streams represented by the symbols SI-$s_4$, $S_5$-$S_8$, etc. directly from the received parallel signals yp$y_4$, $y_5$-$y_8$, etc. using maximum-likelihood decoding (or some other decoder metric).

Overview of Spherical Coverage

A channel between a user equipment (UE) and a network entity (e.g., a gNodeB (gNB)) may be characterized by multiple clusters with each cluster corresponding to a reflection or scattering of signals from the gNB to the UE via a physical object (e.g., vehicles, humans, glass/metallic objects, etc.). Azimuth angle of arrival (AOA) and zenith angle of arrival (ZOA) of signals for each of the cluster as seen at the UE side can be along any direction (e.g., due to ground bounces, reflections from different objects, etc.). Since the AOA and the ZOA of the signals are expected to be from any direction at the UE side, good array gain metrics for a UE may include a good coverage of the array gain over a sphere around the UE. This is called as a spherical coverage of effective isotropic radiated power (EIRP) and/or effective isotropic sensitivity (EIS).

EIRP is a measurement of the radiated output power from an equivalent isotropic antenna in a single direction. The isotropic antenna is meant to distribute power equally in all directions. When the power of the isotropic antenna is channeled in the single direction, the power radiated in that single direction can be substantially higher leading to an increased EIRP value. In antenna measurements, measured sensitivity over each angle is called the EIS of an antenna in that direction. Similar to EIRP, EIS can show a significantly altered/reduced value in some directions corresponding to the channeling of energy along a single direction by a non-isotropic antenna.

The performance over a sphere around the UE may be specified by a cumulative distribution function (CDF) of the EIRP and/or the EIS over the sphere (called as the spherical coverage metric), which is a combination of a transmitted power and the array gain. An upper bound to the spherical coverage may be based on electric field (E-field) radiation data of antennas of one or more antenna arrays of an antenna module computed assuming maximum ratio combining (MRC) of the antenna elements in the array.

Spherical coverage objectives for the UE may be specified in terms of a peak performance (e.g., a peak array gain) and different percentile levels (e.g., $20^{th}$, $50^{th}$, $80^{th}$ percentile levels) of the EIRP/EIS over the sphere around the UE at different frequencies and/or bands.

Overview of Antenna Modules

A user equipment (UE) or any other wireless node may include at least one antenna module, which further includes one or more antenna arrays having a set of antennas elements (or antennas). The antenna module may include or is a linear antenna array or a planar antenna array. Each antenna module may be controlled or managed by one or more radio frequency (RF) integrated circuit (RFIC) chips.

Antenna polarization can be indicated via a direction in which an electric field of a radio wave oscillates while it propagates through a medium. A point of reference for specifying a polarization is looking at it from the transmitter of a signal. This can be visualized by imagining standing directly behind an antenna module or an antenna array, and looking in the direction it is aimed. In the case of a horizontal polarization (H), the electric field will move sideways in a horizontal plane. That is, an electric field vector of electro-magnetic wave is parallel to the earth. This is generated by having antenna modules or antenna arrays horizontal to the earth. For vertical polarization (V), the electric field is illustrated as oscillating up and down in a vertical plane. That is, the electric field vector of the electro-magnetic wave is perpendicular to the earth. This is generated by having the antenna modules or the antenna arrays vertical to the earth.

In some cases, the UE may include one antenna module on its one side (or a long edge). The antenna module may include or is a 1×5 linear antenna array. The linear antenna array may include one or more antenna elements, and is able to steer energy along a single boresight direction. In some cases, multiple antenna modules may be placed on a single long edge or side of the UE. For example, the UE may include two antenna modules on its one edge or side.

In some cases, a higher number of antenna elements in a given direction in the antenna array may increase peak array gain in said direction. In some cases, multiple antenna elements steered along different directions of the antenna array or the antenna module increases antenna coverage across different directions (e.g., with lower percentile levels of effective isotropic radiated power (EIRP) and/or effective isotropic sensitivity (EIS) over a sphere around the UE).

In some cases, to realize spherical coverage objectives for the UE at middle and lower percentile points, additional directional coverage of the energy (i.e., more than one boresight direction) is required than provided by the linear antenna array. The additional directional coverage of the energy can be achieved by using multiple antenna modules (e.g., which may include small linear and/or planar antenna arrays such as 1×4 antenna array, 1×3 antenna array, etc.) at the UE. For example, the UE may be equipped with one or more antenna modules on multiple edges or sides of the UE for the additional directional coverage of the energy. The antenna modules on the different edges or sides of the UE may be intended to provide coverage over different parts of a sphere (e.g., so as to achieve the good spherical coverage and to add robustness to blockage).

In some cases, the different antenna modules on the different edges or sides of the UE can be combined for receiving and/or transmitting signals (e.g., as this may assist in improving performance in terms of signal coverage). For example, the different antenna modules can be combined at RF, intermediate frequency (IF) and/or baseband (BB) levels.

Figure 5:
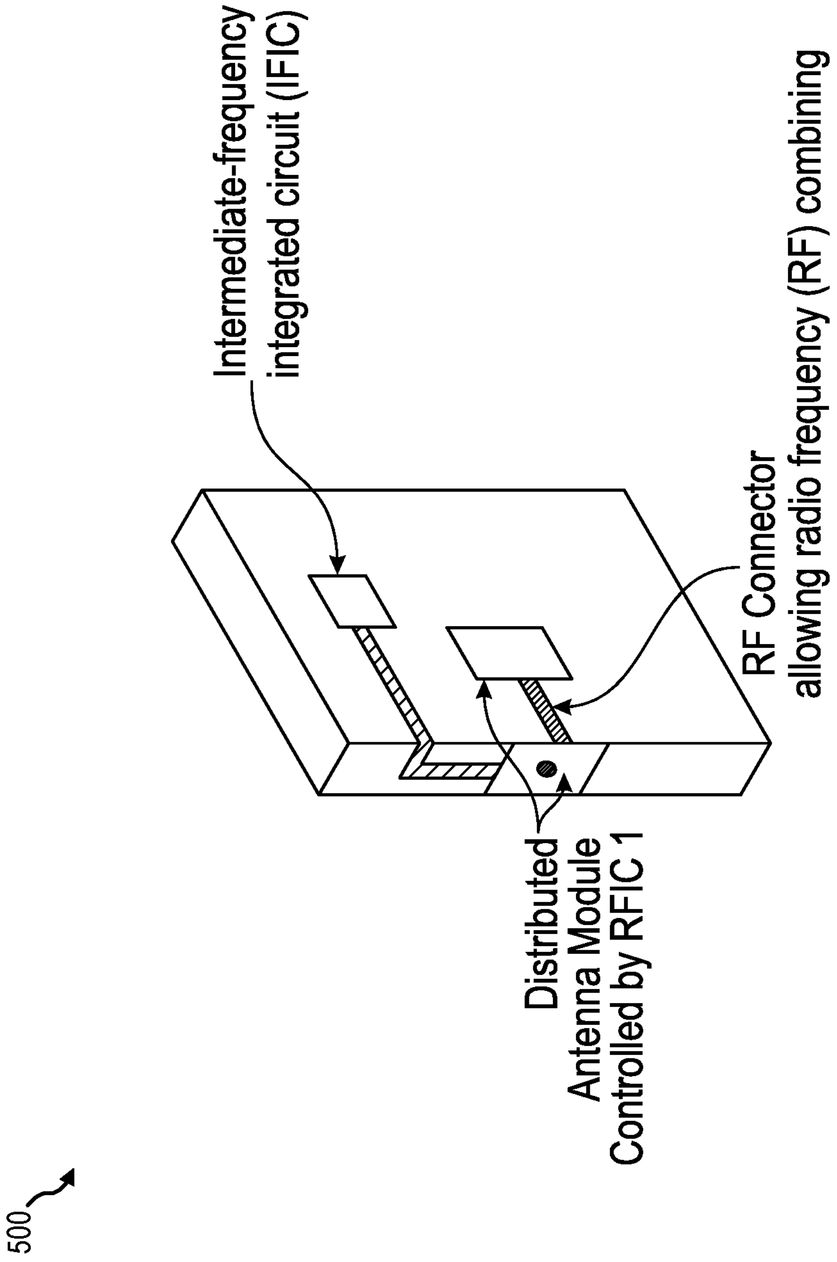
FIG. 5 depicts example combining of parts or components of at least one distributed antenna module using a radio frequency (RF) connector.

FIG. 5 depicts a diagram 500 illustrating combining of parts of a distributed antenna module at a UE using an RF connector (e.g., which may allow RF combining). The distributed antenna module may be managed or controlled by an RFIC. The distributed antenna module may include two antenna parts or components (e.g., separated by a fixed distance/separation) that may be combined at an RF level using the RF connector. In some cases, the RF connector may cause a feedline loss, which may increase as carrier frequency increases (e.g., losses may be on an order of 1-2 decibel (dB) per centimeter (cm)). In some cases, the RF combining may require flexible structures, which may make realizations of the distributed antenna module expensive. So, the RF combining across the distributed antenna module may usually be feasible when different components/parts of the distributed antenna module are geographically close to each other (e.g., and yet point in different directions for enhanced spherical coverage across these different directions). Such structure of the distributed antenna module may allow enhanced antenna array gains, as an overlap region between different sides of the distributed antenna module may be substantial, to allow the enhanced antenna array gains with the RF combining.

Figure 6:
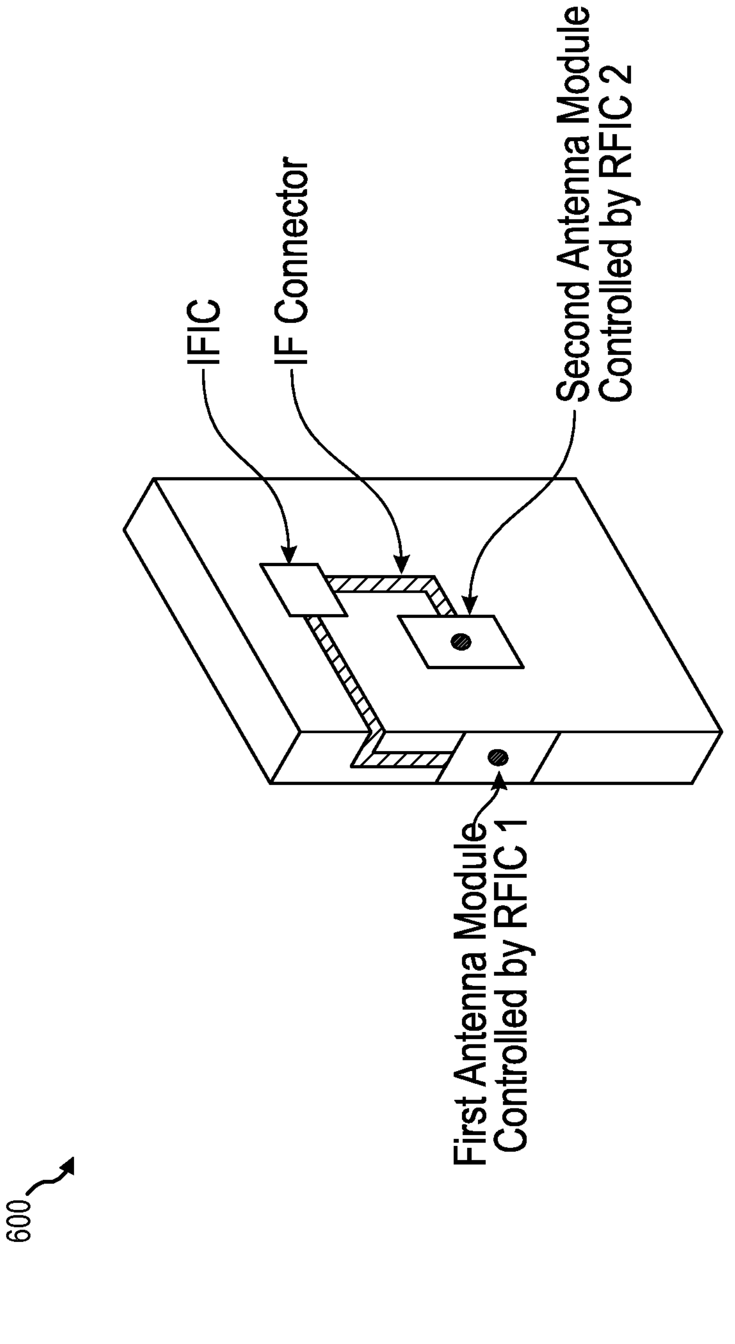
FIG. 6 depicts example intermediate frequencies (IF) or base band (BB) combining of two antenna modules of a wireless node.

FIG. 6 depicts a diagram 600 illustrating IF or BB combining of two separated antenna modules at a UE. The UE may include a first antenna module on a first side/edge of the UE and a second antenna module on a second side/edge of the UE. The first antenna module may be managed or controlled by a first RFIC chip, and the second antenna module may be managed or controlled by a second RFIC chip. Each of these antenna modules may include or is a linear antenna array (e.g., with multiple antenna elements), and be able to steer energy along an independent boresight direction.

In some cases, the first antenna module and the second antenna module may be combined at the BB level. In some cases, the first antenna module and the second antenna module may be combined at the IF level using an IF connector/cable. In general, a cost of the IF connector/cable may increase as the IF increases and the length of the IF connector/cable increases. So, most IF connectors/cables may be a bottleneck in low-cost implementations of the UE. In some cases, IF combining of the antenna modules may get away with multiple low-cost modules, but since an overlap region between the different antenna modules is usually smaller, the combined antenna gains of the different antenna modules may also be relatively smaller.

In some cases, there are many variations associated with signals during operations at millimeter wave (mmW) radio frequency bands. For example, the signals at the mmW radio frequency bands may be affected by temperature variations corresponding to the different antenna modules of the UE, a distance between the antenna modules of the UE, etc. In such cases, to ensure that a beam from each antenna module of the UE may point to a certain boresight direction, the different antenna modules of the UE that are used in simultaneous communications may have to be calibrated. The calibration may make certain that a correct value of a phase response is applied to the antenna elements of the different antenna modules (e.g., as opposed to an ideal value of the phase response) during transmit/receive operations, by taking into consideration the temperature variations associated with the different antenna modules of the UE, the distance between the antenna modules of the UE, etc. (e.g., which may cause a phase change of the antenna elements of the different antenna modules).

Currently, there are some calibration techniques available, which can be implemented to perform calibration of different antenna elements within a single antenna module (i.e., intra-RFIC calibration corresponding to a single RFIC of the single antenna module). The intra-RFIC calibration may be a function of many parameters such as a number of phase shifters used (e.g., which may depend on a number of antenna elements) at the UE, antenna array gain stages used (e.g., which may lead to impact of phase levels) at the UE, temperature setting of the single antenna module, and/or frequency setting at the UE.

However, these calibration techniques may not be able to assist in the calibration of the different antenna modules of the UE (i.e., inter-RFIC calibration corresponding to RFICs of the different antenna modules). The inter-RFIC calibration may be based on parameters such as temperature and frequency settings of a material that may connect the two RFICs, in addition to some of the above-noted parameters related to the intra-RFIC calibration. Accordingly, there is a need for developing inter-RFIC calibration techniques.

In some cases, the inter-RFIC calibration can be performed offline. However, a number of parameters may grow dramatically as mmW systems support large frequency ranges and may incur significant thermal overheads leading to a bigger range of temperature fluctuations (e.g., which may cause phase changes at the antenna elements that may have to be addressed via the calibration process). So, on-demand calibration for inter-RFIC variations may be more useful, as triggering of the on-demand calibration for the inter-RFIC variations may allow tracking of temperature/frequency changes (e.g., which can be slow/fast). Based on the latest temperature/frequency changes, the inter-RFIC calibration techniques may determine and apply the phase response on the antenna elements of the different antenna modules to adjust a phase of the antenna elements of the different antenna modules. Accordingly, there is need for on-demand inter-RFIC calibration techniques.

Aspects Related to Calibration Via Two-Way Signaling to Enable Antenna Module Combining Aspects of the present disclosure provide apparatuses, methods, processing systems, and computer-readable mediums for managing calibration of multiple antenna modules of a wireless node such as a user equipment (UE).

Techniques proposed herein may use two-way signaling between a gNodeB (gNB) and a UE to perform inter radio frequency (RF) integrated circuit (IC) chip calibration (e.g., corresponding to RFICs of the antenna modules of the UE). For example, the proposed techniques may require some signaling between the gNB and the UE as well as some feedback from the gNB to the UE to collect all information needed to perform the inter-RFIC calibration.

The signaling between the gNB and the UE may include: the gNB beamforming over symbols corresponding to all antenna elements of the antenna modules of the UE and the UE receiving first signals from the gNB, and the UE beamforming with same beams over the same symbols and the gNB receiving second signals from the UE. The gNB may send the feedback to the UE indicating information associated with the second signals, since the information associated with the second signals is not known by the UE. The UE may compute calibration adjustment parameters based on information associated with the first signals (e.g., which is known to the UE since the UE received the first signals) and the information associated with the second signals (e.g., which is obtained from the gNB). The calibration adjustment parameters may indicate differences between first phase and/or amplitude values applicable at antenna elements of the different antenna modules (e.g., during uplink) and second phase and/or amplitude values applicable at the antenna elements of the different antenna modules (e.g., during downlink). The UE may adjust uplink and/or downlink part of RFIC circuitry of the different antenna modules based on the calibration adjustment parameters.

Particular aspects of the subject matter described in this disclosure can be implemented to realize one or more of the following potential advantages. In some examples, the described inter-RFIC calibration techniques may allow/enable combining of the multiple antenna modules of the UE for receiving and/or transmitting the signals, which may improve performance in terms of signal coverage.

The techniques proposed herein for managing the calibration via the two-way signaling to enable antenna module combining may be understood with reference to FIG. 7-FIG. 10.

Figure 7:
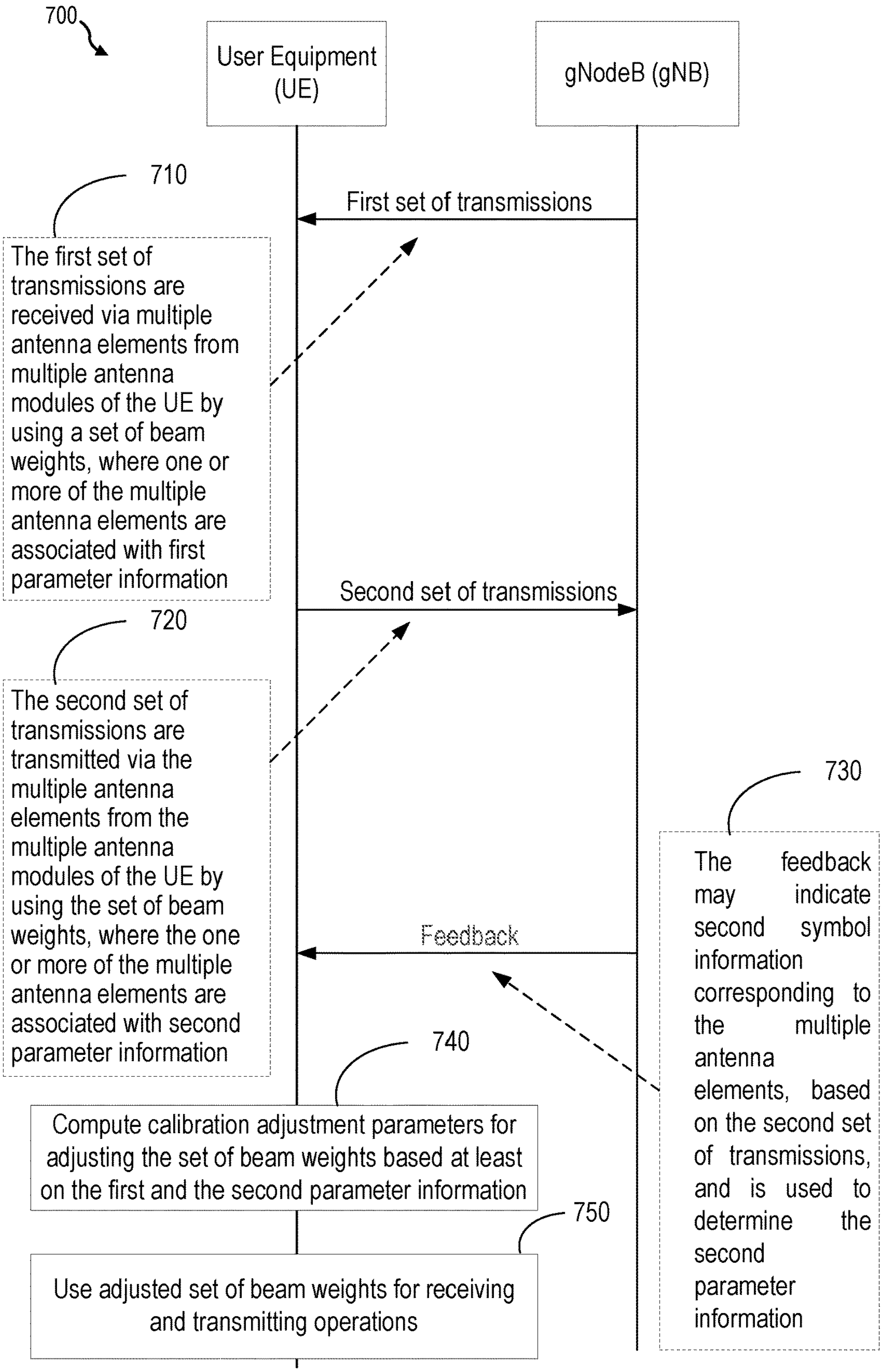
FIG. 7 depicts a call flow diagram illustrating example communication among wireless nodes (such as a UE and a network entity) for managing combining of multiple antenna modules of a wireless node.

FIG. 7 depicts a call flow diagram 700 illustrating example communication among wireless nodes such as a UE and a network entity (e.g., a gNB). The UE shown in FIG. 7 may be an example of the UE 104 depicted and described with respect to FIG. 1 and FIG. 3. The gNB depicted in FIG. 7 may be an example of the BS 102 depicted and described with respect to FIG. 1 and FIG. 3, or the disaggregated BS depicted and described with respect to FIG. 2.

As indicated at 710, the gNB transmits a first set of transmissions (e.g., one or more downlink transmissions) to the UE. The gNB includes a set of antenna elements (e.g., two or more antennas in a single antenna module). The UE receives the first set of transmissions. The UE may receive the first set of transmissions via multiple antenna elements of multiple antenna modules at the UE (e.g., by using a set of beam weights/beams). The set of beam weights may include beam weights used at each symbol corresponding to each antenna element of the multiple antenna modules. In one example, the UE may receive the first set of transmissions via all antenna elements of the multiple antenna modules. In another example, the UE may receive the first set of transmissions via some of the antenna elements of the multiple antenna modules.

Figure 8:
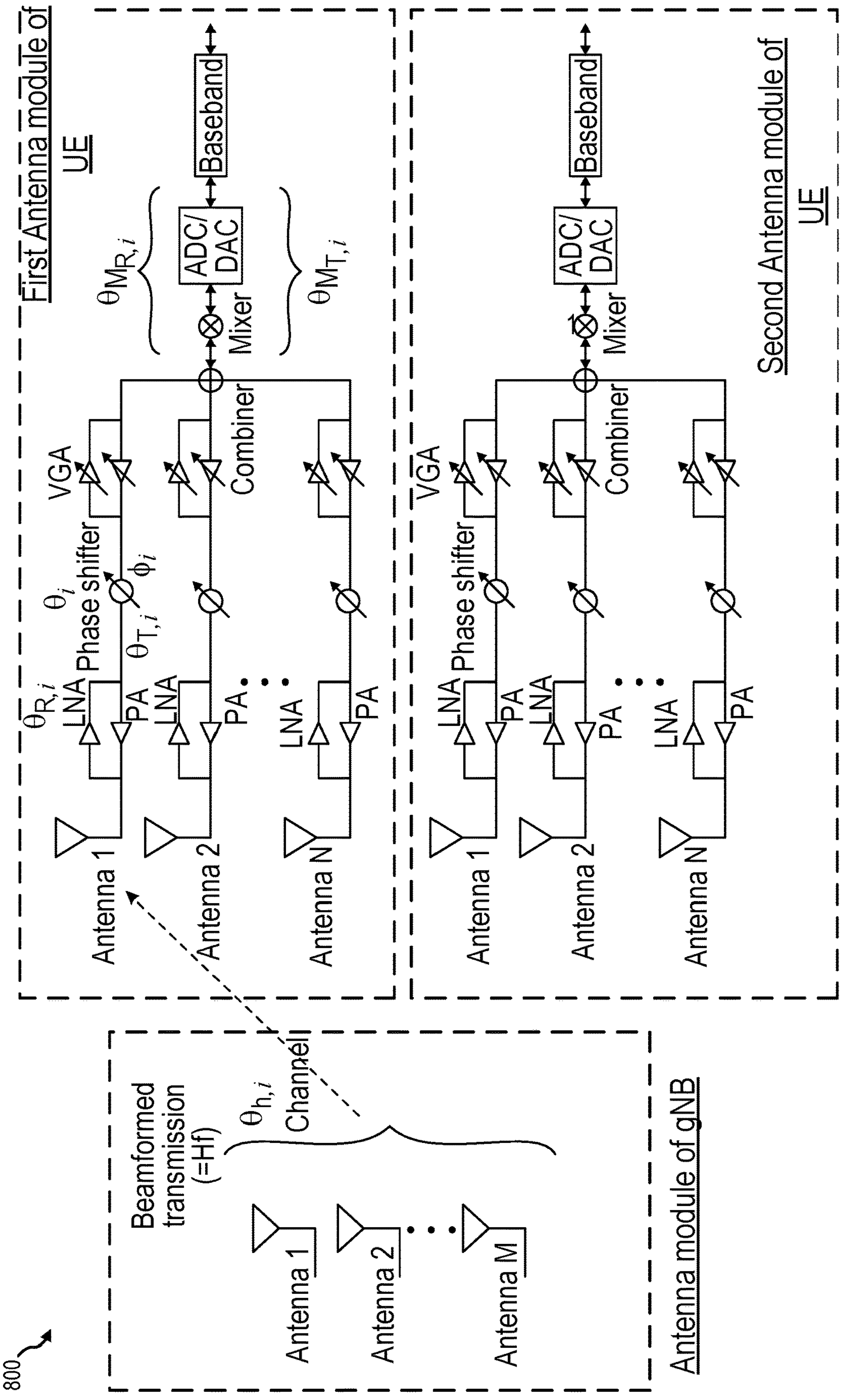
FIG. 8 depicts example communication among a UE with two antenna modules and a gNodeB (gNB) with a single antenna module for enabling combining of the antenna modules of the UE.

In certain aspects, as illustrated in a diagram 800 of FIG. 8, the multiple antenna modules of the UE may include a first antenna module and a second antenna module (e.g., which may be connected to each other and/or combined at RF, intermediate frequency (IF) or base band (BB) levels). The first antenna module may include a first number of antenna elements (e.g., $N_1$ antenna elements or antennas) and a first set of radio frequency integrated circuit (RFIC) chips controlling the first number of antenna elements. For example, each antenna element of the first antenna module may be controlled or managed by an independent RFIC chip (e.g., which may include a low noise amplifier (LNA), a power amplifier (PA), a phase shifter for the downlink and uplink path, a combiner or a mixer independent or same for the downlink and uplink path, an analog-to-digital converter (ADC), and/or a digital-to-analog converter (DAC)). The second antenna module may include a second number of antenna elements (e.g., $N_2$ antenna elements or antennas) and a second set of RFIC chips controlling the second number of antenna elements. For example, each antenna element of the second antenna module may be controlled or managed by an independent RFIC chip.

Referring back to FIG. 7, in certain aspects, one or more of the multiple antenna elements of the multiple antenna modules at the UE may be associated with first parameter information (e.g., during receive/downlink operations). For example, the first parameter information may indicate values of different parameters (e.g., phase response, amplitude response) associated with each antenna element of the multiple antenna modules at the UE during the receiving of the first set of transmissions.

In one aspect, the first parameter information may indicate phase responses/values corresponding to the one or more of the multiple antenna elements of the multiple antenna modules (e.g., during the receive operations). For example, the first parameter information may indicate a phase response corresponding to a receive portion of an RF circuit associated with each antenna element of the multiple antenna modules at the UE.

In another aspect, the first parameter information may indicate amplitude responses/values corresponding to the one or more of the multiple antenna elements of the multiple antenna modules (e.g., during the receive operations). For example, the first parameter information may indicate an amplitude response corresponding to the receive portion of the RF circuit associated with each antenna element of the multiple antenna modules at the UE.

In certain aspects, the UE may receive and/or determine first symbol information based on symbols corresponding to the multiple antenna elements of the multiple antenna modules at the UE (e.g., during the receive operations). For example, the first symbol information may indicate information (e.g., obtained based on the first set of transmissions) received at each symbol corresponding to each antenna element of the multiple antenna modules at the UE from the gNB.

In certain aspects, the UE may compute the first parameter information (e.g., phase/amplitude contributions etc. across each antenna element of the multiple antenna modules at the UE during the receive operations) based on at least the set of beam weights and the first symbol information, in accordance with Equation (1) shown below.

$$[y_R^1 \ \cdots \ y_R^{N_1+N_2}] = \left[\alpha_1 \cdot e^{j\cdot\left(\theta_{h,1}+\theta_{M_R,1}+\theta_{R,1}\right)} \ \cdots \ \alpha_{N_1+N_2} \cdot e^{j\cdot\left(\theta_{h,N_1+N_2}+\theta_{M_R,N_1+N_2}+\theta_{R,N_1+N_2}\right)}\right] \cdot \begin{bmatrix} A_1^1 e^{j\theta_1^1} & \cdots & A_1^{N_1+N_2} e^{j\theta_1^{N_1+N_2}} \\ \vdots & \ddots & \vdots \\ A_{N_1+N_2}^1 e^{j\theta_{N_1+N_2}^1} & \cdots & A_{N_1+N_2}^{N_1+N_2} e^{j\theta_{N_1+N_2}^{N_1+N_2}} \end{bmatrix} \tag{1}$$

In Equation (1), $N_1+N_2$ symbols are used for reception over two antenna modules so that receive parts of RFIC circuitry are excited over the two antenna modules. The received symbols over these $N_1+N_2$ symbols are denoted as $y_R^1, \ldots, y_R^{N_1+N_2}$.

In Equation (1), $$\begin{bmatrix} A_1^1 e^{j\theta_1^1} & \cdots & A_1^{N_1+N_2} e^{j\theta_1^{N_1+N_2}} \\ \vdots & \ddots & \vdots \\ A_{N_1+N_2}^1 e^{j\theta_{N_1+N_2}^1} & \cdots & A_{N_1+N_2}^{N_1+N_2} e^{j\theta_{N_1+N_2}^{N_1+N_2}} \end{bmatrix}$$

represents the set of beam weights used at the $N_1+N_2$ symbols with each column vector denoting the beam weights used over that symbol. In particular, $A_1^1$ denotes an amplitude used over the first antenna element of the first module at the first symbol and a corresponding phase shift used over the first antenna element is denoted as $e^{j\theta_1^1}$. Similarly, $A_k^m$ an amplitude over k-th antenna element at m-th symbol.

In Equation (1), $$\alpha_1 \cdot e^{j\cdot\left(\theta_{h,1}+\theta_{M_R,1}+\theta_{R,1}\right)}$$

represents the receive circuit level phase contributions at the first antenna element (e.g., of the multiple antenna modules at the UE), and $$\alpha_{N_1+N_2} \cdot e^{j\cdot\left(\theta_{h,N_1+N_2}+\theta_{M_R,N_1+N_2}+\theta_{R,N_1+N_2}\right)}$$

represents the receive circuit level phase contributions at the $(N_1+N_2)$-th antenna element (e.g., of the multiple antenna modules at the UE).

As indicated at 720, the UE transmits a second set of transmissions (e.g., one or more uplink transmissions) via the multiple antenna elements of the multiple antenna modules at the UE to the gNB (e.g., by using the same set of beam weights/beams). In one example, the UE may transmit the second set of transmissions via all antenna elements of the multiple antenna modules. In another example, the UE may transmit the second set of transmissions via some of the antenna elements of the multiple antenna modules.

In certain aspects, the one or more of the multiple antenna elements are associated with second parameter information (e.g., during transmit/uplink operations). For example, the second parameter information may indicate values of different parameters (e.g., phase response, amplitude response) associated with each antenna element of the multiple antenna modules at the UE during the transmitting of the second set of transmissions.

In one aspect, the second parameter information may indicate phase responses/values corresponding to the one or more of the multiple antenna elements of the multiple antenna modules at the UE (e.g., during the transmit operations). For example, the second parameter information may indicate a phase response corresponding to a transmit portion of an RF circuit associated with each antenna element of the multiple antenna modules at the UE.

In another aspect, the second parameter information may indicate amplitude responses/values corresponding to the one or more of the multiple antenna elements of the multiple antenna modules at the UE (e.g., during the transmit operations). For example, the second parameter information may indicate an amplitude response corresponding to the transmit portion of the RF circuit associated with each antenna element of the multiple antenna modules at the UE.

As indicated at 730, the gNB sends a feedback to the UE that may indicate second symbol information corresponding to the multiple antenna elements of the multiple antenna modules at the UE (e.g., during the transmit operations). For example, the second symbol information may indicate information (e.g., which may be based on the second set of transmissions) at each symbol corresponding to each antenna element of the multiple antenna modules from the gNB.

In certain aspects, the UE may receive/obtain the second symbol information from the gNB, as the second symbol information is unknown to the UE (e.g., since the second symbol information is based on the second set of transmissions that are transmitted by the UE and but are received at the gNB).

In certain aspects, the UE may compute the second parameter information (e.g., phase/amplitude contributions etc. across each antenna element of the multiple antenna modules at the UE during the transmit operations) based on at least the set of beam weights and the second symbol information, in accordance with Equation (2) shown below.

$$\left[y_T^1 \ \ldots \ y_T^{N_1+N_2}\right] = \left[\beta_1 \cdot e^{j\cdot\left(\theta_{h,1}+\theta_{M_T,1}+\theta_{T,1}\right)} \ \ldots \ \beta_{N_1+N_2} \cdot e^{j\cdot\left(\theta_{h,N_1+N_2}+\theta_{M_T,N_1+N_2}+\theta_{T,N_1+N_2}\right)}\right] \cdot \begin{bmatrix} A_1^1 e^{j\theta_1^1} & \cdots & A_1^{N_1+N_2} e^{j\theta_1^{N_1+N_2}} \\ \vdots & \ddots & \vdots \\ A_{N_1+N_2}^1 e^{j\theta_{N_1+N_2}^1} & \cdots & A_{N_1+N_2}^{N_1+N_2} e^{j\theta_{N_1+N_2}^{N_1+N_2}} \end{bmatrix} \tag{2}$$

In Equation (2), the received set of symbols at the gNB are denoted as $y_T^1, \ldots, y_T^{N_1+N_2}$. Here, $y_T^1$ represents receive symbol information at a first symbol and $y_T^{N_1+N_2}$ represents the receive symbol information at the $(N_1+N_2)$-th symbol at the gNB.

In Equation (2), $$\begin{bmatrix} A_1^1 e^{j\theta_1^1} & \cdots & A_1^{N_1+N_2} e^{j\theta_1^{N_1+N_2}} \\ \vdots & \ddots & \vdots \\ A_{N_1+N_2}^1 e^{j\theta_{N_1+N_2}^1} & \cdots & A_{N_1+N_2}^{N_1+N_2} e^{j\theta_{N_1+N_2}^{N_1+N_2}} \end{bmatrix}$$

represents the set of beam weights used at the different symbols corresponding to the $N_1+N_2$ antenna elements (e.g., of the multiple antenna modules at the UE).

In Equation (2), $$\beta_1 \cdot e^{j\cdot\left(\theta_{h,1}+\theta_{M_T,1}+\theta_{T,1}\right)}$$

represents the transmit circuit level amplitude and phase contributions at the first antenna element (e.g., of the multiple antenna modules at the UE), and $$\beta_{N_1+N_2} \cdot e^{j\cdot\left(\theta_{h,N_1+N_2}+\theta_{M_T,N_1+N_2}+\theta_{T,N_1+N_2}\right)}$$

represents the transmit circuit level amplitude and phase contributions at the $(N_1+N_2)$-th antenna element (e.g., of the multiple antenna modules at the UE).

As indicated at 740, the UE determines one or more differences between the first parameter information and the second parameter information. For example, the UE may determine a difference between a phase response at each antenna element of the multiple antenna modules at the UE during the receive operations and a phase response at each antenna element of the multiple antenna modules at the UE during the transmit operations. In another example, the UE may determine a difference between an amplitude response at each antenna element of the multiple antenna modules at the UE during the receive operations and an amplitude response at each antenna element of the multiple antenna modules at the UE during the transmit operations.

In certain aspects, the UE may compute one or more calibration adjustment parameters based on the one or more differences between the first parameter information and the second parameter information. In one example, the calibration adjustment parameters may indicate values corresponding to differences between phase responses/values at each antenna element of the multiple antenna modules at the UE during receive and transmit operations. In another example, the calibration adjustment parameters may indicate values corresponding to differences between amplitude responses/values at each antenna element of the multiple antenna modules at the UE during receive and transmit operations.

In certain aspects, the UE may adjust the set of beam weights (e.g., to be used for receive and/or transmit operations) based on the computed calibration adjustment parameters. In one example, the UE may adjust the set of beam weights (e.g., to be used for the transmit operations) based on a difference between the phase responses/values at the multiple antenna elements of the multiple antenna modules at the UE during receive and transmit operations. In another example, the UE may adjust the set of beam weights (e.g., to be used for the transmit operations) based on a difference between the amplitude responses/values at the multiple antenna elements of the multiple antenna modules at the UE during the receive and transmit operations.

As indicated at 750, the UE uses adjusted set of beam weights for future receiving and transmitting operations.

In certain aspects, a number of symbols associated with the receiving of the first set of transmissions and the transmitting of the second set of transmissions (e.g., for downlink and uplink training) may be based on the first number of antenna elements at the first antenna module of the UE and the second number of antenna elements at the second antenna module of the UE. For example, the number of symbols for receiving and transmitting signals may be equal to a sum of the first number and the second number multiplied by a reference number (e.g., 2 or any other number).

In certain aspects, the UE may receive a set of feedback messages, which may be associated with a number of feedback symbols. The number of feedback symbols may be equal to the sum of the first number and the second number. The feedback may indicate the second symbol information.

In certain aspects, the UE may receive a configuration of a set of beams. For example, the beams used for downlink and uplink training may be configured between the UE and the gNB. The UE may use the set of beams for receiving the first set of transmissions and transmitting the second set of transmissions.

In certain aspects, the configuration of the set of beams may indicate one or more unitary matrices indicating one or more sets of beam weights. In one example, the configuration may indicate a first unitary matrix indicating first beam weights. In another example, the configuration may indicate a second unitary matrix indicating second beam weights. The first beam weights are different from the second beam weights.

In certain aspects, the UE may use the one or more unitary matrices for receiving the first set of transmissions and transmitting the second set of transmissions. In one example, the UE may use a unitary matrix (e.g., of size $N_1+N_2 \times N_1+N_2$), which may not be an identity matrix since the identity matrix may only explore intra-RFIC variations, for receiving the first set of transmissions and transmitting the second set of transmissions.

In certain aspects, the UE may sample one antenna element of the multiple antenna modules in one of RFICs as an anchor antenna element and consider all other antenna elements of the multiple antenna modules across the RFICs to lead according to a same set of beam weights.

Example Method for Wireless Communications

FIG. 9 shows an example of a method 900 for wireless communications at a wireless node. The wireless node may be a user equipment (UE), such as the UE 104 of FIG. 1 and FIG. 3. In some cases, the wireless node may also be a network entity, such as the BS 102 of FIG. 1 and FIG. 3.

Method 900 begins at step 910 with obtaining a first set of transmissions via multiple antenna elements from multiple antenna modules of the UE by using a set of beam weights. One or more of the multiple antenna elements are associated with first parameter information. The first parameter information indicates at least one of: a phase response or an amplitude response corresponding to a receive portion of a radio frequency (RF) circuit of the one or more of the multiple antenna elements. In some cases, the operations of this step refer to, or may be performed by, circuitry for obtaining and/or code for obtaining as described with reference to FIG. 10.

Method 900 then proceeds to step 920 with outputting a second set of transmissions via the multiple antenna elements by using the set of beam weights. The one or more of the multiple antenna elements are associated with second parameter information. The second parameter information indicates at least one of: a phase response or an amplitude response corresponding to a transmit portion of the RF circuit of the one or more of the multiple antenna elements. In some cases, the operations of this step refer to, or may be performed by, circuitry for outputting and/or code for outputting as described with reference to FIG. 10.

Method 900 then proceeds to step 930 with adjusting the set of beam weights in accordance with one or more differences between the first parameter information and the second parameter information. In some cases, the operations of this step refer to, or may be performed by, circuitry for adjusting and/or code for adjusting as described with reference to FIG. 10.

In certain aspects, the method 900 further includes obtaining first symbol information corresponding to the multiple antenna elements, and computing the first parameter information using the set of beam weights and the first symbol information. In some cases, some of these operations may be performed by, circuitry for obtaining and/or code for obtaining as described with reference to FIG. 10. In some cases, some of these operations may be performed by, circuitry for computing and/or code for computing as described with reference to FIG. 10.

In certain aspects, the method 900 further includes obtaining second symbol information corresponding to the multiple antenna elements, and computing the second parameter information using the set of beam weights and the second symbol information. In some cases, some of these operations may be performed by, circuitry for obtaining and/or code for obtaining as described with reference to FIG. 10. In some cases, some of these operations may be performed by, circuitry for computing and/or code for computing as described with reference to FIG. 10.

In certain aspects, the adjusting includes adjusting the set of beam weights for at least one antenna element of the multiple antenna elements by using a difference between a first phase response corresponding to the at least one antenna element and a second phase response corresponding to the at least one antenna element.

In certain aspects, the adjusting includes adjusting the set of beam weights for at least one antenna element of the multiple antenna elements by using a difference between a first amplitude response corresponding to the at least one antenna element and a second amplitude response corresponding to the at least one antenna element.

In certain aspects, the multiple antenna modules include a first antenna module and a second antenna module, the first antenna module includes a first quantity of antenna elements and a first set of radio frequency integrated circuit (RFIC) chips controlling the first quantity of antenna elements, and the second antenna module includes a second quantity of antenna elements and a second set of RFIC chips controlling the second quantity of antenna elements.

In certain aspects, a quantity of symbols associated with the obtaining of the first set of transmissions and the outputting of the second set of transmissions is equal to a sum of the first quantity and the second quantity multiplied by a reference number.

In certain aspects, the method 900 further includes obtaining a feedback associated with a quantity of feedback symbols. The quantity of feedback symbols is equal to a sum of the first quantity and the second quantity. The feedback indicates second symbol information corresponding to the multiple antenna elements. In some cases, some of these operations may be performed by, circuitry for obtaining and/or code for obtaining as described with reference to FIG. 10.

In certain aspects, the method 900 further includes obtaining a configuration of a set of beams, and using the set of beams for the obtaining of the first set of transmissions and the outputting of the second set of transmissions. In some cases, some of these operations may be performed by, circuitry for obtaining and/or code for obtaining as described with reference to FIG. 10.

In certain aspects, the configuration indicates one or more unitary matrices indicating one or more sets of beam weights. The method 900 further includes using the one or more unitary matrices for the obtaining of the first set of transmissions and the outputting of the second set of transmissions. In some cases, some of these operations may be performed by, circuitry for using and/or code for using as described with reference to FIG. 10.

Figure 10:
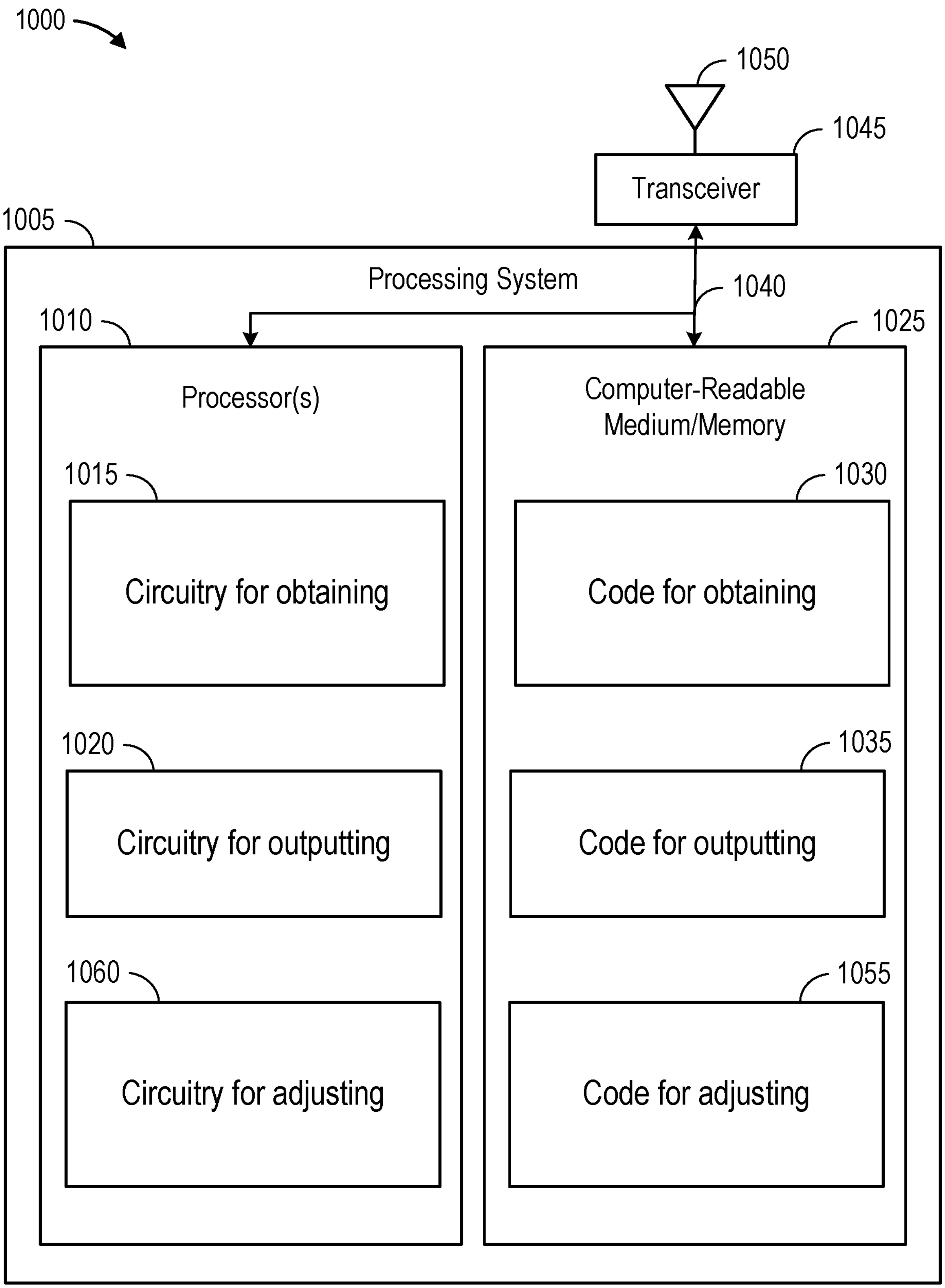
FIG. 10 depict example communications device.

In one aspect, the method 900, or any aspect related to it, may be performed by an apparatus, such as a communications device 1000 of FIG. 10, which includes various components operable, configured, or adapted to perform the method 900. The communications device 1000 is described below in further detail.

Note that FIG. 9 is just one example of a method, and other methods including fewer, additional, or alternative steps are possible consistent with this disclosure.

Example Communications Device

FIG. 10 depicts aspects of an example communications device 1000. In some aspects, communications device 1000 is a user equipment (UE), such as UE 104 described above with respect to FIG. 1 and FIG. 3.

The communications device 1000 includes a processing system 1005 coupled to a transceiver 1045 (e.g., a transmitter and/or a receiver). The transceiver 1045 is configured to transmit and receive signals for the communications device 1000 via an antenna 1050, such as the various signals as described herein. The processing system 1005 may be configured to perform processing functions for the communications device 1000, including processing signals received and/or to be transmitted by the communications device 1000.

The processing system 1005 includes one or more processors 1010. In various aspects, the one or more processors 1010 may be representative of one or more of receive processor 358, transmit processor 364, TX MIMO processor 366, and/or controller/processor 380, as described with respect to FIG. 3. The one or more processors 1010 are coupled to a computer-readable medium/memory 1025 via a bus 1040. In certain aspects, the computer-readable medium/memory 1025 is configured to store instructions (e.g., computer-executable code) that when executed by the one or more processors 1010, cause the one or more processors 1010 to perform the method 900 described with respect to FIG. 9, and/or any aspect related to it. Note that reference to a processor performing a function of communications device 1000 may include the one or more processors 1010 performing that function of communications device 1000.

In the depicted example, the computer-readable medium/memory 1025 stores code (e.g., executable instructions), such as code for obtaining 1030, code for outputting 1035, code for adjusting 1055, code for computing (not shown), and/or code for using (not shown). Processing of the code for obtaining 1030, the code for outputting 1035, the code for adjusting 1055, the code for computing, and/or the code for using may cause the communications device 1000 to perform the method 900 described with respect to FIG. 9, and/or any aspect related to it.

The one or more processors 1010 include circuitry configured to implement (e.g., execute) the code stored in the computer-readable medium/memory 1025, including circuitry such as circuitry for obtaining 1015, circuitry for outputting 1020, circuitry for adjusting 1060, circuitry for computing (not shown), and/or circuitry for using (not shown). Processing with the circuitry for obtaining 1015, the circuitry for outputting 1020, the circuitry for adjusting 1060, the circuitry for computing, and/or the circuitry for using may cause the communications device 1000 to perform the method 900 described with respect to FIG. 9, and/or any aspect related to it.

Various components of the communications device 100 may provide means for performing the method 900 described with respect to FIG. 9, and/or any aspect related to it.

Means for transmitting, sending or outputting (e.g., for transmission) may include transceivers 354 and/or antenna(s) 352 of the UE 104 illustrated in FIG. 3 and/or the code for outputting 1035, the circuitry for outputting 1020, the transceiver 1045 and/or the antenna 1050 of the communications device 1000 in FIG. 10.

Means for receiving or obtaining may include transceivers 354 and/or antenna(s) 352 of the UE 104 illustrated in FIG. 3 and/or the code for obtaining 1030, the circuitry for obtaining 1015, the transceiver 1045 and/or the antenna 1050 of the communications device 1000 in FIG. 10.

Means for adjusting may include processors 380, transceivers 354 and/or antenna(s) 352 of the UE 104 illustrated in FIG. 3 and/or the code for adjusting 1055, the circuitry for adjusting 1060, the one or more processors 1010, the transceiver 1045 and/or the antenna 1050 of the communications device 1000 in FIG. 10.

Means for computing may include processors 380, transceivers 354 and/or antenna(s) 352 of the UE 104 illustrated in FIG. 3 and/or the code for computing, the circuitry for computing, the one or more processors 1010, the transceiver 1045 and/or the antenna 1050 of the communications device 1000 in FIG. 10.

Means for using may include processors 380, transceivers 354 and/or antenna(s) 352 of the UE 104 illustrated in FIG. 3 and/or the code for using, the circuitry for using, the one or more processors 1010, the transceiver 1045 and/or the antenna 1050 of the communications device 1000 in FIG. 10.

In some cases, rather than actually transmitting, for example, signals and/or data, a device may have an interface to output signals and/or data for transmission (a means for outputting). For example, a processor may output signals and/or data, via a bus interface, to a radio frequency (RF) front end for transmission. In various aspects, an RF front end may include various components, including transmit and receive processors, transmit and receive MIMO processors, modulators, demodulators, and the like, such as depicted in the examples in FIG. 3.

In some cases, rather than actually receiving signals and/or data, a device may have an interface to obtain the signals and/or data received from another device (a means for obtaining). For example, a processor may obtain (or receive) the signals and/or data, via a bus interface, from an RF front end for reception. In various aspects, an RF front end may include various components, including transmit and receive processors, transmit and receive MIMO processors, modulators, demodulators, and the like, such as depicted in the examples in FIG. 3. Notably, FIG. 10 is an example, and many other examples and configurations of communication device 1000 are possible.

Example Clauses

Implementation examples are described in the following numbered clauses:

Clause 1: A method for wireless communications at a wireless node, comprising: obtaining a first set of transmissions via multiple antenna elements from multiple antenna modules of the wireless node by using a set of beam weights, wherein one or more of the multiple antenna elements are associated with first parameter information, and wherein the first parameter information indicates at least one of: a phase response or an amplitude response corresponding to a receive portion of a radio frequency (RF) circuit of the one or more of the multiple antenna elements; outputting a second set of transmissions via the multiple antenna elements by using the set of beam weights, wherein the one or more of the multiple antenna elements are associated with second parameter information, and wherein the second parameter information indicates at least one of: a phase response or an amplitude response corresponding to a transmit portion of the RF circuit of the one or more of the multiple antenna elements; and adjusting the set of beam weights in accordance with one or more differences between the first parameter information and the second parameter information.

Clause 2: The method of clause 1, further comprising: obtaining first symbol information corresponding to the multiple antenna elements; and computing the first parameter information, said computation using the set of beam weights and the first symbol information.

Clause 3: The method of any one of clauses 1-2, further comprising: obtaining second symbol information corresponding to the multiple antenna elements; and computing the second parameter information, said computation using the set of beam weights and the second symbol information.

Clause 4: The method of any one of clauses 1-3, wherein the adjusting comprises adjusting the set of beam weights for at least one antenna element of the multiple antenna elements by using a difference between a first phase response corresponding to the at least one antenna element and a second phase response corresponding to the at least one antenna element.

Clause 5: The method of any one of clauses 1-4, wherein the adjusting comprises adjusting the set of beam weights for at least one antenna element of the multiple antenna elements by using a difference between a first amplitude response corresponding to the at least one antenna element and a second amplitude response corresponding to the at least one antenna element.

Clause 6: The method of any one of clauses 1-5, wherein: the multiple antenna modules comprise a first antenna module and a second antenna module; the first antenna module comprises a first quantity of antenna elements and a first set of radio frequency integrated circuit (RFIC) chips controlling the first quantity of antenna elements; and the second antenna module comprises a second quantity of antenna elements and a second set of RFIC chips controlling the second quantity of antenna elements.

Clause 7: The method of clause 6, wherein a quantity of symbols associated with the obtaining of the first set of transmissions and the outputting of the second set of transmissions is equal to a sum of the first quantity and the second quantity multiplied by a reference number.

Clause 8: The method of clause 6, further comprising obtaining a feedback associated with a quantity of feedback symbols, wherein the quantity of feedback symbols is equal to a sum of the first quantity and the second quantity, and wherein the feedback indicates second symbol information corresponding to the multiple antenna elements.

Clause 9: The method of any one of clauses 1-8, further comprising: obtaining a configuration of a set of beams; and using the set of beams for the obtaining of the first set of transmissions and the outputting of the second set of transmissions.

Clause 10: The method of clause 9, wherein the configuration indicates one or more unitary matrices indicating one or more sets of beam weights; and further comprising using the one or more unitary matrices for the obtaining of the first set of transmissions and the outputting of the second set of transmissions.

Clause 11: An apparatus, comprising: a memory comprising instructions; and one or more processors configured, individually or in any combination, to execute the instructions and cause the apparatus to perform a method in accordance with any one of Clauses 1-10.

Clause 12: An apparatus, comprising means for performing a method in accordance with any one of Clauses 1-10.

Clause 13: A non-transitory computer-readable medium comprising executable instructions that, when executed by one or more processors of an apparatus, cause the apparatus to perform a method in accordance with any one of Clauses 1-10.

Clause 14: A computer program product embodied on a computer-readable storage medium comprising code for performing a method in accordance with any one of Clauses 1-10.

Clause 15: A wireless node, comprising: at least one transceiver; at least one memory comprising instructions; and one or more processors, individually or collectively, configured to execute the instructions and cause the wireless node to perform a method in accordance with any one of clauses 1-10, wherein the at least one transceiver is configured to receive the first set of transmissions and transmit the second set of transmissions.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, "a processor," "at least one processor" or "one or more processors" generally refers to a single processor configured to perform one or multiple operations or multiple processors configured to collectively perform one or more operations. In the case of multiple processors, performance the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

In some cases, rather than actually transmitting a signal, an apparatus (e.g., a wireless node or device) may have an interface to output the signal for transmission. For example, a processor may output a signal, via a bus interface, to a radio frequency (RF) front end for transmission. Accordingly, a means for outputting may include such an interface as an alternative (or in addition) to a transmitter or transceiver. Similarly, rather than actually receiving a signal, an apparatus (e.g., a wireless node or device) may have an interface to obtain a signal from another device. For example, a processor may obtain (or receive) a signal, via a bus interface, from an RF front end for reception. Accordingly, a means for obtaining may include such an interface as an alternative (or in addition) to a receiver or transceiver.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the term wireless node may refer to, for example, a network entity or a UE. In this context, a network entity may be a base station (e.g., a gNB) or a module (e.g., a CU, DU, and/or RU) of a disaggregated base station.

While the present disclosure may describe certain operations as being performed by one type of wireless node, the same or similar operations may also be performed by another type of wireless node. For example, operations performed by a network entity may also (or instead) be performed by a UE. Similarly, operations performed by a UE may also (or instead) be performed by a network entity.

Further, while the present disclosure may describe certain types of communications between different types of wireless nodes (e.g., between a network entity and a UE), the same or similar types of communications may occur between same types of wireless nodes (e.g., between network entities or between UEs, in a peer-to-peer scenario). Further, communications may occur in reverse order than described.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. An apparatus for wireless communications, comprising:

at least one transceiver;

multiple antenna modules;

at least one memory comprising instructions; and one or more processors, individually or collectively, configured to execute the instructions to cause the apparatus to:

receive, via the at least one transceiver, a first set of transmissions via multiple antenna elements from the multiple antenna modules by using a set of beam weights, wherein one or more of the multiple antenna elements are associated with first parameter information, and wherein the first parameter information indicates at least one of: a phase response or an amplitude response corresponding to a receive portion of a radio frequency (RF) circuit of the one or more of the multiple antenna elements;

transmit, via the at least one transceiver, a second set of transmissions via the multiple antenna elements by using the set of beam weights, wherein the one or more of the multiple antenna elements are associated with second parameter information, and wherein the second parameter information indicates at least one of: a phase response or an amplitude response corresponding to a transmit portion of the RF circuit of the one or more of the multiple antenna elements; and adjust the set of beam weights in accordance with one or more differences between the first parameter information and the second parameter information.

2. The apparatus of claim 1, wherein the one or more processors, individually or collectively, are configured to execute the instructions to cause the apparatus to:

receive, via the at least one transceiver, first symbol information corresponding to the multiple antenna elements; and compute the first parameter information, said computation using the set of beam weights and the first symbol information.

3. The apparatus of claim 1, wherein the one or more processors, individually or collectively, are configured to execute the instructions to cause the apparatus to:

receive, via the at least one transceiver, second symbol information corresponding to the multiple antenna elements; and compute the second parameter information, said computation using the set of beam weights and the second symbol information.

4. The apparatus of claim 1, wherein the adjust comprises adjust the set of beam weights for at least one antenna element of the multiple antenna elements by using a difference between a first phase response corresponding to the at least one antenna element and a second phase response corresponding to the at least one antenna element.

5. The apparatus of claim 1, wherein the adjust comprises adjust the set of beam weights for at least one antenna element of the multiple antenna elements by using a difference between a first amplitude response corresponding to the at least one antenna element and a second amplitude response corresponding to the at least one antenna element.

6. The apparatus of claim 1, wherein:

the multiple antenna modules comprise a first antenna module and a second antenna module;

the first antenna module comprises a first quantity of antenna elements and a first set of radio frequency integrated circuit (RFIC) chips controlling the first quantity of antenna elements; and the second antenna module comprises a second quantity of antenna elements and a second set of RFIC chips controlling the second quantity of antenna elements.

7. The apparatus of claim 6, wherein a quantity of symbols associated with the receiving of the first set of transmissions and the transmitting of the second set of transmissions is equal to a sum of the first quantity and the second quantity multiplied by a reference number.

8. The apparatus of claim 6, wherein the one or more processors, individually or collectively, are configured to execute the instructions to cause the apparatus to receive, via the at least one transceiver, a feedback associated with a quantity of feedback symbols, wherein the quantity of feedback symbols is equal to a sum of the first quantity and the second quantity, and wherein the feedback indicates second symbol information corresponding to the multiple antenna elements.

9. The apparatus of claim 1, wherein the one or more processors, individually or collectively, are configured to execute the instructions to cause the apparatus to:

receive, via the at least one transceiver, a configuration of a set of beams; and use the set of beams for the receiving of the first set of transmissions and the transmitting of the second set of transmissions.

10. The apparatus of claim 9, wherein:

the configuration indicates one or more unitary matrices indicating one or more sets of beam weights; and the one or more processors, individually or collectively, are configured to execute the instructions to cause the apparatus to use the one or more unitary matrices for the receiving of the first set of transmissions and the transmitting of the second set of transmissions.

11. The apparatus of claim 1, wherein the apparatus is configured to operate as a user equipment (UE).

12. A method for wireless communications by a wireless node, comprising:

receiving a first set of transmissions via multiple antenna elements from multiple antenna modules of the wireless node by using a set of beam weights, wherein one or more of the multiple antenna elements are associated with first parameter information, and wherein the first parameter information indicates at least one of: a phase response or an amplitude response corresponding to a receive portion of a radio frequency (RF) circuit of the one or more of the multiple antenna elements;

transmitting a second set of transmissions via the multiple antenna elements by using the set of beam weights, wherein the one or more of the multiple antenna elements are associated with second parameter information, and wherein the second parameter information indicates at least one of: a phase response or an amplitude response corresponding to a transmit portion of the RF circuit of the one or more of the multiple antenna elements; and adjusting the set of beam weights in accordance with one or more differences between the first parameter information and the second parameter information.

13. The method of claim 12, further comprising:

receiving first symbol information corresponding to the multiple antenna elements; and computing the first parameter information, said computation using the set of beam weights and the first symbol information.

14. The method of claim 12, further comprising:

receiving second symbol information corresponding to the multiple antenna elements; and computing the second parameter information, said computation using the set of beam weights and the second symbol information.

15. The method of claim 12, wherein the adjusting comprises adjusting the set of beam weights for at least one antenna element of the multiple antenna elements by using a difference between a first phase response corresponding to the at least one antenna element and a second phase response corresponding to the at least one antenna element.

16. The method of claim 12, wherein the adjusting comprises adjusting the set of beam weights for at least one antenna element of the multiple antenna elements by using a difference between a first amplitude response corresponding to the at least one antenna element and a second amplitude response corresponding to the at least one antenna element.

17. The method of claim 12, wherein:

the multiple antenna modules comprise a first antenna module and a second antenna module;

the first antenna module comprises a first quantity of antenna elements and a first set of radio frequency integrated circuit (RFIC) chips controlling the first quantity of antenna elements; and the second antenna module comprises a second quantity of antenna elements and a second set of RFIC chips controlling the second quantity of antenna elements.

18. The method of claim 17, wherein a quantity of symbols associated with the receiving of the first set of transmissions and the transmitting of the second set of transmissions is equal to a sum of the first quantity and the second quantity multiplied by a reference number.

19. The method of claim 17, further comprising receiving a feedback associated with a quantity of feedback symbols, wherein the quantity of feedback symbols is equal to a sum of the first quantity and the second quantity, and wherein the feedback indicates second symbol information corresponding to the multiple antenna elements.

* * * * *